(12) United States Patent
Inoue et al.

(10) Patent No.: US 8,510,010 B2
(45) Date of Patent: Aug. 13, 2013

(54) VEHICLE CONTROL DEVICE AND METHOD OF CONTROLLING VEHICLE

(75) Inventors: Gen Inoue, Susono (JP); Yasuhito Ishida, Toyokawa (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 442 days.

(21) Appl. No.: 12/674,283

(22) PCT Filed: Sep. 5, 2008

(86) PCT No.: PCT/IB2008/002304
§ 371 (c)(1),
(2), (4) Date: Feb. 19, 2010

(87) PCT Pub. No.: WO2009/031017
PCT Pub. Date: Mar. 12, 2009

(65) Prior Publication Data
US 2011/0208398 A1    Aug. 25, 2011

(30) Foreign Application Priority Data
Sep. 6, 2007  (JP) ................................. 2007-231296

(51) Int. Cl.
- *B60T 8/32* (2006.01)
- *G06F 19/00* (2011.01)
- *B60C 23/00* (2006.01)
- *B60Q 1/00* (2006.01)

(52) U.S. Cl.
USPC ................. 701/93; 701/70; 340/444; 340/441

(58) Field of Classification Search
USPC ..................... 701/93, 36, 48, 29.7, 30.3, 30.5, 701/30.6, 30.8, 30.9, 31.1, 31.2, 67, 54, 70, 701/79, 83, 84, 87, 95, 110; 340/988–996
See application file for complete search history.

(56) References Cited

U.S. PATENT DOCUMENTS 4,885,710 A * 12/1989 Hersberger et al. ........... 702/146
4,989,923 A    2/1991 Lee et al.
(Continued)

FOREIGN PATENT DOCUMENTS

DE  43 14 449 A1    11/1994
EP  0 992 411 A2    4/2000
(Continued)

OTHER PUBLICATIONS

International Search Report issued in Application No. PCT/IB2008/002304 on May 8, 2009.
(Continued)

*Primary Examiner* — Muhammad Shafi
(74) *Attorney, Agent, or Firm* — Oliff & Berridge, PLC

(57) ABSTRACT

A vehicle control device for controlling the driving force and the braking force that is applied to a vehicle to approach a target wheel speed includes a plurality of determination parts that determine the wheel speed at a corresponding wheel; and a calculation part that calculates a valid wheel speed threshold for each wheel based on determined wheel speeds. The vehicle control device also includes a decision part that decides whether wheel speed is valid depending on whether the valid wheel speed threshold calculated for each wheel is below a specific speed threshold value, which is below the target wheel speed, and an estimation part that estimates the vehicle speed using the wheel speeds that are determined as being valid.

12 Claims, 7 Drawing Sheets

(56) References Cited

U.S. PATENT DOCUMENTS

| | | | |
|---|---|---|---|
| 5,612,879 A * | 3/1997 | Makino | 701/70 |
| 5,819,193 A | 10/1998 | Burgdorf et al. | |
| 6,384,594 B1 | 5/2002 | Uehara et al. | |
| 6,446,018 B1 | 9/2002 | Isermann et al. | |
| 6,560,539 B1 * | 5/2003 | Mueller et al. | 702/14 |

FOREIGN PATENT DOCUMENTS

| | | |
|---|---|---|
| EP | 1 055 574 A2 | 11/2000 |
| JP | A-7-257352 | 10/1995 |
| JP | A-11-142520 | 5/1999 |
| JP | A-2003-276472 | 9/2003 |
| JP | A-2004-90679 | 3/2004 |
| JP | A-2005-009390 | 1/2005 |

OTHER PUBLICATIONS

Office Action issued in U.S. Appl. No. 12/230,852 dated Sep. 16, 2011.

Aug. 4, 2010 Office Action issued in German Patent Application No. DE 112008002422.7 (with translation).

Office Action issued in Japanese Patent Application No. 2007-231296 dated May 17, 2011 (with partial translation).

\* cited by examiner

VEHICLE CONTROL DEVICE AND METHOD OF CONTROLLING VEHICLE

BACKGROUND OF THE INVENTION

1. Field of Invention

The present invention relates to a technique for estimating the vehicle speed with high accuracy. More specifically, the present invention relates to a technique for estimating the vehicle speed with high accuracy to prevent the execution of an erroneous control by a vehicle control device such as, for example, an anti-skid control device (ABS), traction control device (TRC) or rear wheel steering device (4WS).

2. Description of Related Art

Generally, to properly execute a vehicle control operation that depends on the vehicle speed, the validity of wheel speeds, which are used as the basis for calculating the vehicle speed, is critical. In particular, if the vehicle is moving at a low speed, the validity of detection values may be dubious because the outputs from wheel speed sensors are below the detectable speed level. Thus, it is necessary to determine the validity of the wheel speeds accurately using the lowest calculated wheel speed value in other words, a valid wheel speed threshold.

For example, Japanese Patent Application Publication No. 7-257352 (JP-A-7-257352) describes a vehicle control device that selects the higher of the lowest calculated wheel speed value and a permission speed as a reference to permit vehicle control and compares the selected value and the vehicle speed to determine whether to execute the control operation.

However, the vehicle control device described in JP-A-7-257352 may not be able to perform a control operation properly depending on the lowest calculated wheel speed value when a constant speed traveling is performed at a low speed of 0 to 5 km/h as shown in Japanese Patent Application Publication No. 2004-90679 (JP-A-2004-90679). Also, the actual vehicle speed may deviate greatly from the target vehicle speed when a constant speed traveling is performed at a low speed.

SUMMARY OF THE INVENTION

The present invention provides a vehicle control device and a vehicle control method that estimates the vehicle speed with high accuracy to prevent erroneous control even during a constant low-speed traveling control.

A first aspect of the present invention relates to a vehicle control device. The vehicle control device controls the driving force and braking force that is applied to a vehicle to approach a target wheel speed. The vehicle control device includes: a plurality of determination parts each of which determines a wheel speed of a corresponding one of a plurality of wheels of the vehicle; a calculation part that calculates a valid wheel speed threshold for each wheel based on the corresponding determined wheel speed; a decision part that compares the valid wheel speed threshold calculated for each wheel with a specific speed threshold value that is below the target wheel speed and decides the validity of each wheel speed based on the comparison; and an estimation part that estimates the vehicle speed based on the wheel speeds that are determined as being valid by the decision part.

The decision part may decide that the wheel speed, of a wheel is valid if the valid wheel speed threshold for the wheel is below the specific speed threshold value.

In the vehicle control device according to the first aspect, the target wheel speed may be calculated based on, for example, various sensor information, vehicle information, or information about operations of the driver. The vehicle control device controls the driving force and braking force that is applied to the vehicle to maintain a target wheel speed with high accuracy. To execute the vehicle control properly, accurate estimation of the vehicle speed is critical. In the control for bringing the vehicle speed to the target wheel speed, it is possible to improve the accuracy in matching the vehicle speed with the target wheel speed.

Thus, each determination part determines the wheel speed of a corresponding one of a plurality of wheels of the vehicle. Each determination part may detect the wheel speed based on the period of a signal that varies with the rotation of the wheel. In the case of a four-wheel vehicle, all the wheels may be provided with a determination part. In view of variations among the wheels, at least two of the wheel may be provided with a determination part.

The calculation part calculates a valid wheel speed threshold for each wheel based on the determined wheel speeds.

The calculation part may set a minimum wheel speed determinable by the respective determination part as the valid wheel speed threshold for the wheel.

The determined wheel speed of a wheel may be considered invalid (in other words, as an unreliable value) and regarded as 0 km/h, for example, if it is not greater than the valid wheel speed threshold for the wheel. The default values of the valid wheel speed thresholds may set in advance as a minimum wheel speed value which the determination parts can assure in the manufacturing facility of the vehicle. For example, the default values may be 3 km/h. Since the default values of the valid wheel speed thresholds are merely estimated values and highly likely to be greater than the actual valid wheel speed thresholds, the default values are updated as appropriate to make them closer to the actual valid wheel speed thresholds by various methods.

The decision part compares the valid wheel speed threshold calculated for each wheel with a specific speed threshold value and decides whether the wheel speed of each wheel is valid. That is, the decision part may decide that the wheel speed is valid if the valid wheel speed threshold for the wheel is below the specific speed threshold value. The specific speed threshold value is a value which is obtained as a minimum speed that the wheel speed sensors are generally believed to be able to measure and may be lower than the target speed.

The reason why the specific speed threshold value needs to be lower than the target speed is as follows. For example, when the target speed is 5 km/h and when the specific speed threshold value is set to 5.5 km/h, the valid wheel speed thresholds may be 5.3 km/h, which is lower than the specific speed threshold value but higher than the target speed of 5 km/h. Then, the validity of the wheel speeds determined at a speed around the target speed of 5 km/h cannot be fully assured. On the contrary, when the specific speed threshold value is set to 4.8 km/h, the validity of the wheel speeds determined at a speed around the target speed of 5 km/h can be fully assured since the valid wheel speed thresholds are lower than the specific speed threshold value. Therefore, when the specific speed threshold value is lower than the target speed, a vehicle speed can be estimated based on wheel speeds with fully assured validity.

The estimation part estimates a vehicle speed based on the wheel speeds of the wheels decided to be valid by the decision part. For example, the estimation part estimates a vehicle speed based on the average of the wheel speeds decided to be valid.

Therefore, according to the vehicle control device, any invalid wheel speed is excluded when a vehicle speed is estimated. Then, since the validity of the wheel speeds for use in the estimation of a vehicle speed is fully assured, the reliability of vehicle control is improved.

When it is decided that any of the wheel speeds is not valid, the estimation part may estimate the vehicle speed based on the wheel speeds except at least one relatively low wheel speed.

In this aspect, when it is decided that any of the wheel speeds of the wheels determined are not valid, it is estimated that the invalid wheel speeds are relatively low wheel speeds including the lowest wheel speed, and a vehicle speed is properly estimated based on the wheel speeds except the invalid wheel speeds.

The calculation part may substitute each valid wheel speed threshold with a value obtained by increasing the valid wheel speed threshold by a specified amount.

A second aspect of the present invention relates to a vehicle control device. The vehicle control device controls the driving force and braking force to be applied to a vehicle to maintain the vehicle speed at a target speed. The vehicle control device includes: a plurality of determination parts each of which determines a wheel speed of a corresponding one of a plurality of wheels of the vehicle; a calculation part that calculates a valid wheel speed threshold for each wheel based on the corresponding determined wheel speed; a decision part that compares the wheel speed of each wheel determined with the valid wheel speed threshold calculated for the wheel and decides the validity of each wheel speed based on the comparison; and an estimation part that estimates a vehicle speed based on the wheel speeds that are decided as being valid by the decision part.

The decision part may decide that the wheel speed is valid if the wheel speed is higher than the valid wheel speed threshold for the wheel.

In this aspect, a vehicle speed of the vehicle can be properly estimated based on the wheel speeds except any wheel speeds that are below the valid wheel speed threshold therefore, that is, invalid wheel speeds. In this case, time monitoring may be involved in the decision process of the decision part.

The calculation part may set a minimum wheel speed detectable by the respective determination part as the valid wheel speed threshold for the wheel. In this case, the robustness can be improved.

In this aspect, when a relatively high wheel speed among the wheel speeds of the wheels determined is higher than a specific vehicle speed threshold value, the estimation part estimates a vehicle speed of the vehicle based on the wheel speeds except at least one relatively low wheel speed.

In this case, when the vehicle is running at a high speed greater than the specific vehicle speed threshold value, a wheel speed detection failure may occur and the estimated vehicle speed value may show a sharp drop.

Therefore, when a relatively high wheel speed among the determined wheel speeds of the wheels determined is exceeds a threshold vehicle speed, the estimation part may estimate the vehicle speed based on the wheel speeds except at least one relatively low wheel. Since a vehicle speed is estimated based on the wheel speeds except at least one relatively low wheel speed, which is considered abnormal (for example, the lowest wheel speed), a drop of the estimated vehicle speed can be prevented.

The calculation part may substitute each valid wheel speed threshold with a value obtained by increasing the valid wheel speed threshold by a specified amount.

A third aspect of the present invention relates to a vehicle control method. The vehicle control method controls the driving force and braking force to be applied to a vehicle to approach a target wheel speed. The vehicle control method includes: determining wheel speeds of a plurality of vehicle wheels; calculating a valid wheel speed threshold for each wheel based on the determined wheel speeds; comparing the valid wheel speed threshold calculated for each wheel with a threshold vehicle speed that is lower than the target wheel speed, and deciding the validity of each wheel speed based on the comparison; and estimating a vehicle speed based on the wheel speeds that are decided as being valid.

A fourth aspect of the present invention relates to a vehicle control method. The vehicle control method controls the driving force and braking force that is applied to a vehicle to maintain a target vehicle speed. The vehicle control method includes: determining wheel speeds of a plurality of vehicle wheels; calculating a valid wheel speed threshold for each wheel based on the determined wheel speeds; comparing the wheel speed of each wheel determined with the valid wheel speed threshold calculated for the wheel, and deciding the validity of each wheel speed based on the comparison; and estimating a vehicle speed based on the wheel speeds that are decided as being valid.

A fifth aspect of the present invention relates to a vehicle control device. The vehicle control device controls the driving force and braking force that is applied to a vehicle to maintain a target vehicle speed. The vehicle control device includes: a plurality of determination parts each of which determines a wheel speed of a corresponding one of a plurality of wheels of the vehicle; a calculation part that calculates a valid wheel speed threshold for each wheel based on the corresponding determined wheel speed; a decision part that compares the valid wheel speed threshold calculated for each wheel with a specific speed threshold value that is below a target wheel speed based on the target vehicle speed and decides the validity of each wheel speed based on the comparison; and an estimation part that estimates the vehicle speed based on the wheel speeds that are determined as being valid by the decision part.

A sixth aspect of the present invention relates to a vehicle control method. The vehicle control method controls the driving force and braking force to be applied to a vehicle to maintain a target vehicle speed. The vehicle control method includes: determining wheel speeds of a plurality of vehicle wheels; calculating a valid wheel speed threshold for each wheel based on the determined wheel speeds; comparing the valid wheel speed threshold calculated for each wheel with a threshold vehicle speed that is lower than a target wheel speed based on the target vehicle speed, and deciding the validity of each wheel speed based on the comparison; and estimating a vehicle speed based on the wheel speeds that are decided as being valid.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6 is a time chart showing the TRC control using vehicle speeds estimated by the vehicle control device according to the first embodiment (in the case where one wheel speed is not valid; and.

DETAILED DESCRIPTION OF EMBODIMENTS

Figure 1:
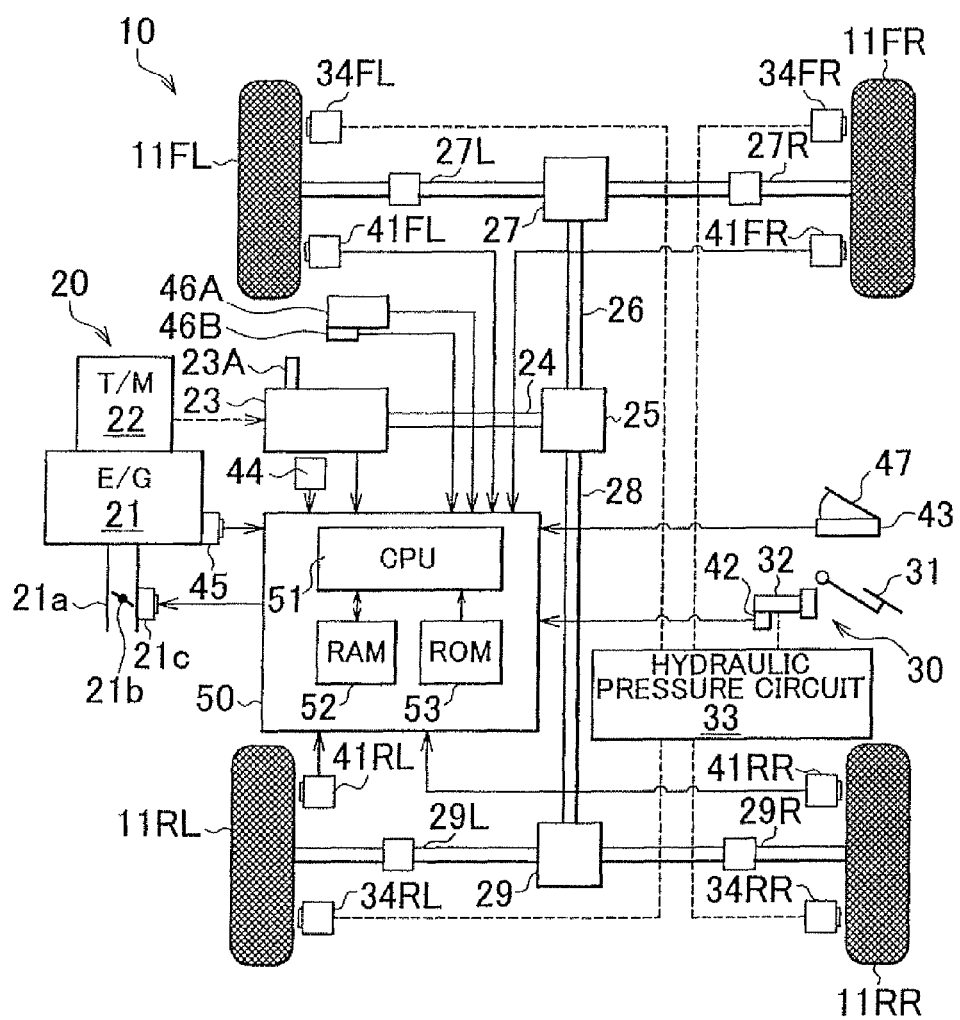
FIG. 1 is a schematic plan view illustrating a vehicle equipped with a vehicle control device according to a first embodiment of the present invention.

A first embodiment of the present invention is described. FIG. 1 is a schematic plan view illustrating a vehicle 10 equipped with a vehicle control device according to a first embodiment of the present invention.

The vehicle 10 shown in FIG. 1 is a four-wheel-drive vehicle, and has a right front wheel 11FR, a left front wheel 11FL, a right rear wheel 11RR and a left rear wheel 11RL. The vehicle 10 also has a drive unit 20 and a brake system 30.

The drive unit 20 has an engine 21 as a driving source of the vehicle 10, a transmission 22, a transfer 23, an output shift 24, and a center differential 25.

The engine 21 may be a spark ignition internal combustion engine equipped with an electronic fuel injection device (not shown), for example. The engine 21 has an intake pipe 21a that defines an intake passage, a throttle valve 21b, and a throttle valve actuator 21c.

The throttle valve 21b is rotatably supported in the intake pipe 21a. The opening amount of the throttle valve 21b is adjusted to vary the open cross-sectional area in the intake pipe 21a and thereby adjust the output torque of the engine 21. The throttle valve actuator 21c adjusts the opening amount of the throttle valve 21b in response to a drive signal (that is, command signal).

The transmission 22 may be a conventional gear mechanism. The transmission 22 establishes an optimum transmission ratio for the driving conditions of the vehicle 10.

The transfer 23 includes an auxiliary transmission that may be formed using a conventional gear mechanism. The transfer 23 transmits drive power in a power transmission mode for a high-speed gear ratio (which may be hereinafter referred to as "I-I-range mode" as needed) or in a power transmission mode for a low-speed gear ratio (which may be hereinafter referred to as "L-range mode" as needed) when the driver operates an operation lever 23A. In addition, the transfer 23 outputs a signal indicating whether the operation lever 23A is in the "H-range mode" position or the "L-range mode" position to an electronic control device 50.

With the above configuration, the output torque of the engine 21 (the power generated by the driving source) is adjusted according to a specific transmission gear ratio, which is determined based on the conditions of the transmission 22 and the transfer 23. The output shaft 24 transmits the adjusted torque to the center differential 25.

In addition, the drive unit 20 has a front wheel propeller shaft 26, a front differential 27, a right front wheel driveshaft 27R, and a left front wheel driveshaft 27L. The front wheel propeller shaft 26 transmits the torque output from the center differential 25 via the output shaft 24 to the front differential 27. The front differential 27 transmits the torque transmitted from the front wheel propeller shaft 26 to the right front wheel driveshaft 27R and the left front wheel driveshaft 27L. The right front wheel driveshaft 27R rotates the right front wheel 11FR with the torque transmitted thereto from the front differential 27. Similarly, the left front wheel driveshaft 27L rotates the left front wheel 11FL with the torque transmitted thereto from the front differential 27.

Further, the drive unit 20 has a rear wheel propeller shaft 28, a rear differential 29, a right rear wheel driveshaft 29R, and a left rear wheel driveshaft 29L. The rear wheel propeller shaft 2S transmits the torque output from the center differential 25 to the rear differential 29. The rear differential 29 transmits the torque transmitted from the rear wheel propeller shaft 28 to the right rear wheel driveshaft 29R and the left rear wheel driveshaft 29L. The right rear wheel driveshaft 29R rotates the right rear wheel 11RR with the torque transmitted thereto from the rear differential 29. Similarly, the left rear wheel driveshaft 29L rotates the left rear wheel 11RL with the torque transmitted thereto from the rear differential 29.

With the above configuration, the output torque of the engine 21 is converted into driving forces to rotate the right front wheel 11FR, the left front wheel 11FL, the right rear wheel 11RR, and the left rear wheel 11RL.

The brake system 30 has a brake pedal 31, a master cylinder 32, a hydraulic pressure circuit 33, and wheel cylinders 34FR, 34FL, 34RR and 34RL.

A conventional master cylinder 32 that increases and decreases the hydraulic pressure of brake oil (that is, master cylinder pressure) may be used. The hydraulic pressure is transmitted to the hydraulic pressure circuit 33 accordance with the degree of displacement of the brake pedal 31.

The hydraulic pressure circuit 33 has a reservoir, an oil pump and various types of valves (not shown), and produces a temporary braking hydraulic pressure that is applied to the wheel cylinders 34FR, 34FL, 34RR and 34RL in response to a signal from the electronic control device 50. The hydraulic pressure circuit 33 applies either the master cylinder pressure or the produced temporary braking hydraulic pressure to the wheel cylinders 34FR, 34FL, 34RR and 34RL as a final braking hydraulic pressure based on a signal from the electronic control device 50.

The wheel cylinders 34FR, 34FL, 34RR and 34RL are positioned at the right front wheel 11FR, the left front wheel 11FL, the right rear wheel 11RR and the left rear wheel 11RL, respectively. The wheel cylinders 34FR, 34FL, 34RR and 34RL generate the braking force necessary to reduce the rotational speed of the rotors of the right front wheel 11FR, the left front wheel 11FL, the right rear wheel 11RR, and the left rear wheel 11RL based on the braking hydraulic pressure applied by the hydraulic pressure circuit 33.

With the above configuration, the master cylinder pressure or the braking hydraulic pressure adjusted by the hydraulic pressure circuit 33 is converted into braking force required to reduce the rotational speed of the right front wheel 11FR, the left front wheel 11FL, the right rear wheel 11RR, and the left rear wheel 11RL.

The vehicle braking force is the sum total of the forces applied to the wheels to reduce the rotational speed of the wheels (in other words, a force applied to the vehicle), and is applied in a direction opposite to the vehicle driving force which propels the vehicle in the traveling direction. In the following description, the force applied at each wheel is referred to as "wheel braking force," and the overall force applied to the vehicle is referred to as "vehicle braking force."

The electronic control device 50 is connected to wheel speed sensors 41FR, 41FL, 41RR and 41RL, a pressure sensor 42, an accelerator operation amount sensor 43, a tilt sensor 44, an engine speed sensor 45, a constant speed traveling control switch 46A, and a target vehicle speed selector 46B.

The wheel speed sensors 41FR, 41FL, 41RR and 41RL detect a wheel speed VWFR of the right front wheel 11FR, a wheel speed VWFL of the left front wheel 11FL, a wheel speed VWRR of the right rear wheel 11RR, and a wheel speed VWRL of the left rear wheel 11RL, respectively, and output signals indicating the detected wheel speeds to the electronic control device 50.

The pressure sensor 42 detects the master cylinder pressure Pm and outputs a signal indicating the detected master cylinder pressure Pm to the electronic control device 50.

The accelerator operation amount sensor 43 detects the displacement Ap of the accelerator pedal 47, and outputs a signal indicating the detected displacement to the electronic control device 50.

The tilt sensor 44 outputs a signal indicating the pitch of the vehicle to the electronic control device 50. A pitch of "0" means that the vehicle is level, and a positive pitch means that the front of the vehicle is higher in elevation than the rear of the vehicle.

The engine speed sensor 45 detects a rotation signal NE from the engine 21 and outputs a signal indicating the detected rotation signal NE to the electronic control device 50.

The constant speed traveling control switch 46A outputs a signal indicating an ON state or OFF state selected by the driver to the electronic control device 50. The target vehicle speed selector 46B outputs a signal indicating the position of the target vehicle speed selector 46B (Hi, Mid or Lo) selected by the driver to the electronic control device 50. The signal indicating the position of the target vehicle speed selector 46B is used to set the target speed.

The electronic control device 50 may be a conventional microcomputer including a CPU (Central Processing Unit) 51, a RAM (Random Access Memory) 52, a ROM (Read-Only Memory) 53 and an input-output port. The input-output port is electrically connected to the sensors 41 to 45, the constant speed traveling control switch 46A, the target vehicle speed selector 46B, the throttle valve actuator 21c, and the hydraulic pressure circuit 33 of the brake system 30. The input-output port supplies the signals from the sensors 41 to 45, the constant speed traveling control switch 46A, and the target vehicle speed selector 46B to the CPU 51. Also a drive signal to the throttle valve actuator 21c and a brake signal to the hydraulic pressure circuit 33 are output through the input-output port based on the result of operation of the CPU 51.

The CPU 51 in FIG. 1 may be regarded as the "decision part" and the "estimation part" of the present invention. In addition, the wheel speed sensors 41FR, 41FL, 41RR and 41RL may be regarded as the "determination parts" of the present invention.

Figure 2:
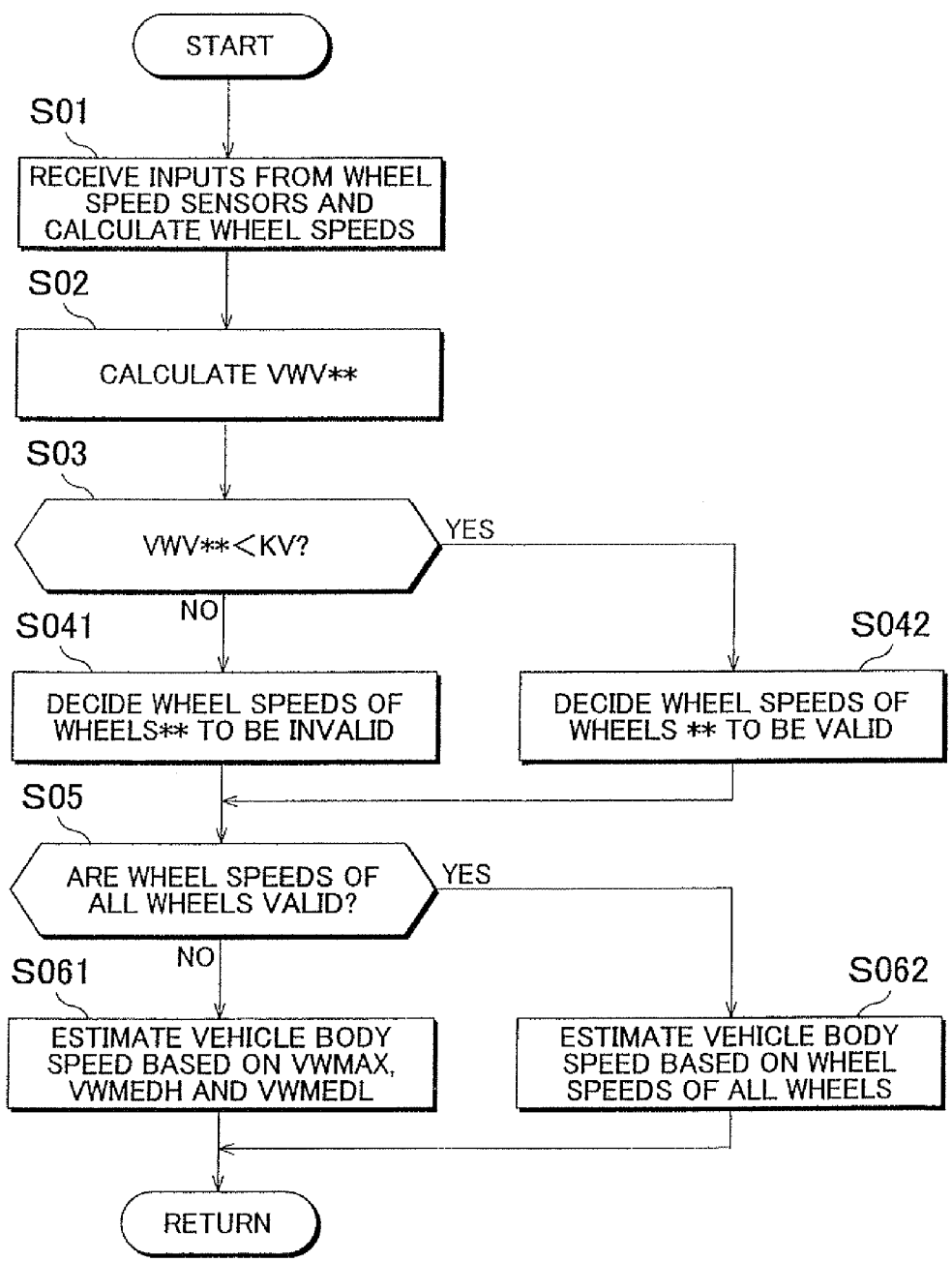
FIG. 2 is a flowchart of a vehicle speed estimation process in the vehicle control device according to the first embodiment.

Referring next to the flowchart of FIG. 2, a vehicle speed estimation process in the vehicle control device according to the first embodiment is described. The differences between the case where all the wheel speeds are valid and the case where even one wheel speed is invalid are described with reference to FIG. 3 and FIG. 4 as needed.

As shown in FIG. 2, the CPU 51 calculates the wheel speeds VW of the wheels based on inputs from the wheel speed sensors 41 when the vehicle 10 is in motion (step S01). Then, the CPU 51 calculates valid wheel speed threshold VWV for the wheels based on the calculated wheel speeds (step S02). Here, "" represents the target wheels of the update process from among the right front wheel 11FR, the left front wheel 11FL, the right rear wheel 11RR, and the left rear wheel 11RL. For example, valid wheel speed threshold VWV** represent the wheel speed valid values as targets of the update process, that is, the speeds which can assure the validity of the output values from the corresponding wheel speed sensors. The update process is performed for each wheel separately.

Then, it is determined whether each of the valid wheel speed threshold VWV of the wheels satisfies the relation: "VWV<KV" (step S03). The value KV may be regarded as the specific threshold speed of the present invention. The specific threshold speed KV is set to a speed that is slightly lower than the target speed based on an input by the driver and so on. For example, if the target speed is 5 km/h, the specific speed threshold value KV is set to 4.8 km/h.

If the relation "VWV<KV" is satisfied (step S03: YES), it is determined that the wheel speed VW of the wheel is valid (step S042).

If the relation "VWV<KV" is not satisfied, (step S03: NO), it is determined that the wheel speed VW of the wheel is not valid, that is, invalid (step S041).

When the decision is made for each of the wheels, it is decided whether the wheel speeds of all the wheels are valid (step S05).

Figure 3:
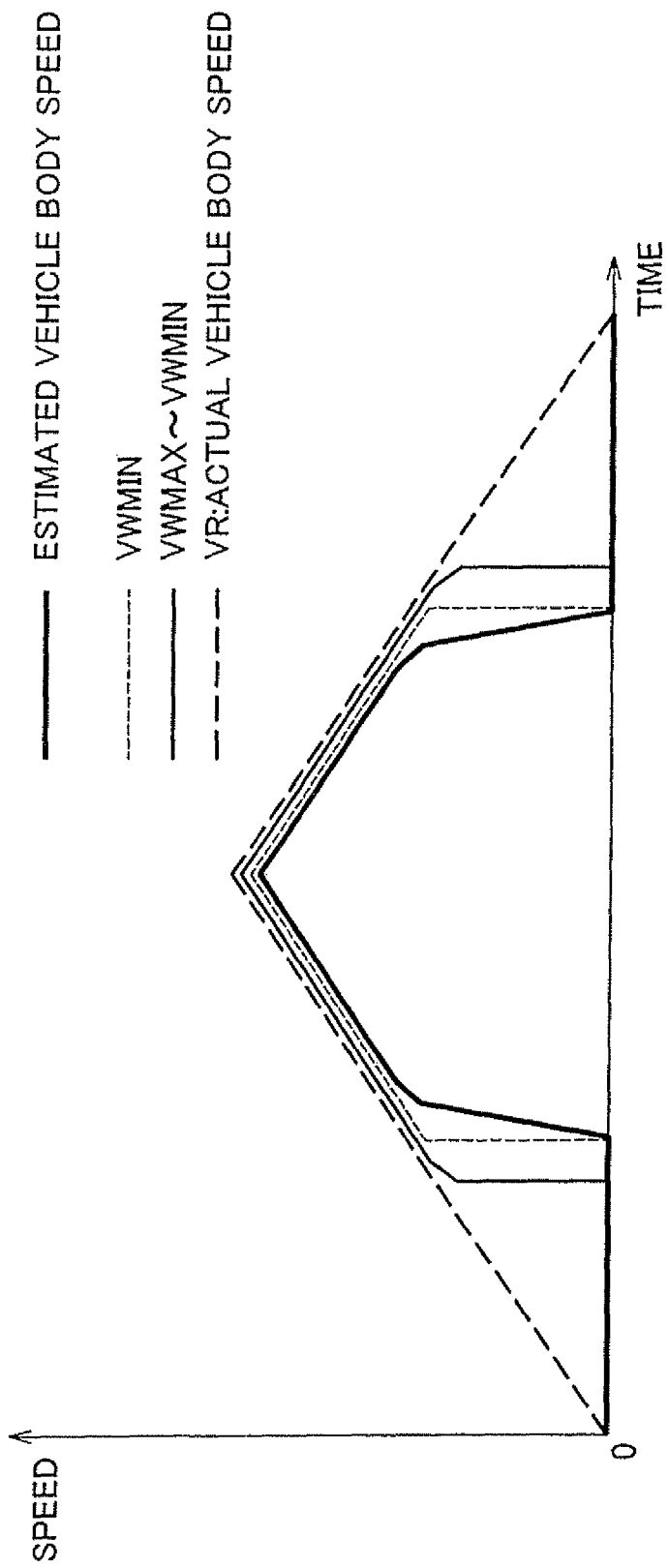
FIG. 3 is a time chart showing changes in vehicle speed estimated by the vehicle control device according to the first embodiment (in the case where all the wheel speeds are valid)

Then, if the wheel speed of each wheel is valid (step S05: YES), the CPU 51 estimates the vehicle speed based on the wheel speed VW of each wheel (step S062). This operation is shown in the time chart of FIG. 3. In FIG. 3, the actual vehicle speed is first accelerated and then decelerated. In this case, because all the wheel speeds, from the lowest wheel speed VWMIN to the highest wheel speed VWMAX, are determined to be valid, the vehicle speed may be properly estimated using the wheel speed VW from each wheel.

Figure 4:
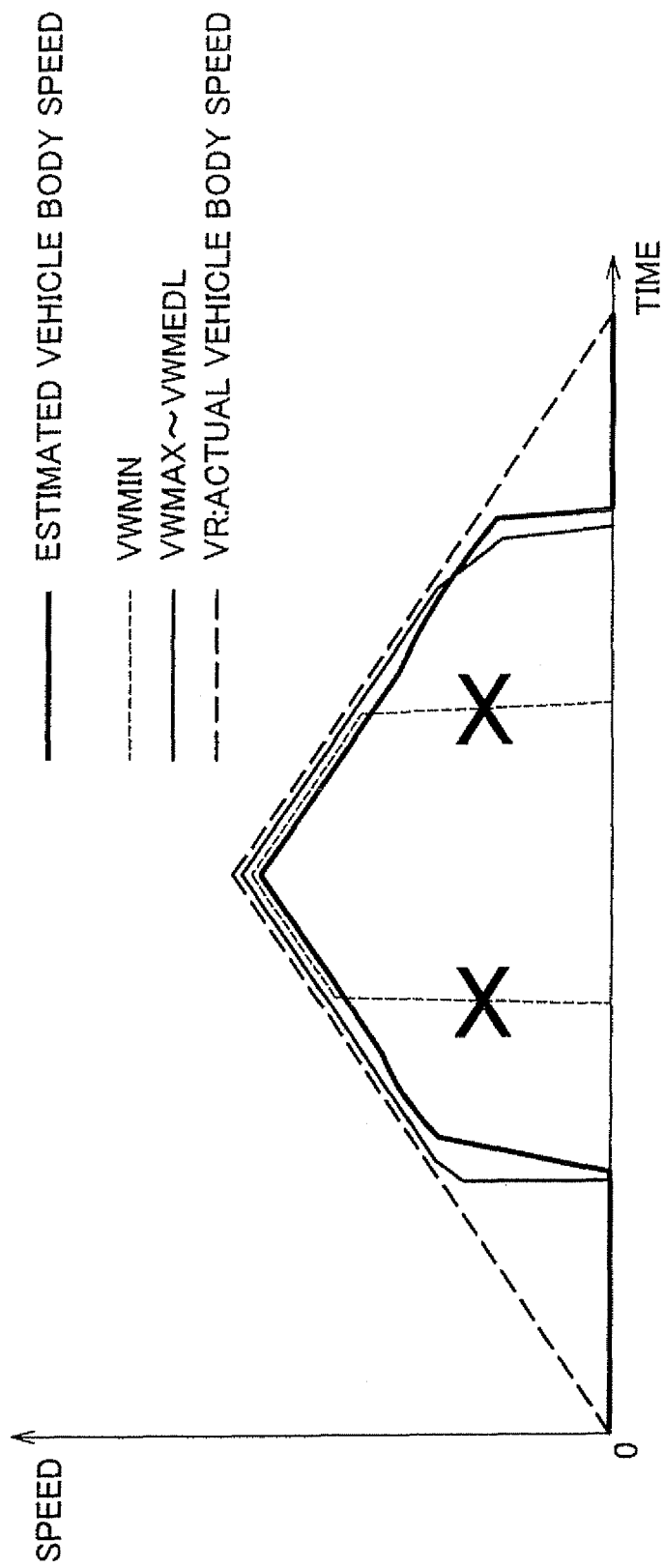
FIG. 4 is a time chart showing changes in vehicle speed estimated by the vehicle control device according to the first embodiment (in the case where even one wheel speed is not valid.

Referring again to FIG. 2, if even one wheel speed is not valid (step S05: NO), the CPU 51 estimates the vehicle speed based on the highest wheel speed VWMAX, the second highest wheel speed VWMEDH, and the third highest wheel speed VWMEDL (step S061). In other words, a vehicle speed is estimated all the wheel speeds with the exception of the lowest wheel speed VWMIN. This operation is shown in the time chart of FIG. 4. In FIG. 4, the actual vehicle speed is first accelerated and then decelerated. In this case, because the vehicle speed is estimated all the wheel speeds with the exception of the wheel speed VWMIN, underestimation due to the wheel speed VWMIN is avoided and a vehicle speed close to the actual vehicle speed may be properly estimated.

Next, the difference in TRC control depending on whether the vehicle speeds estimated as described above are used is discussed with reference to the time charts of FIG. 5 and FIG. 6.

Figure 5:
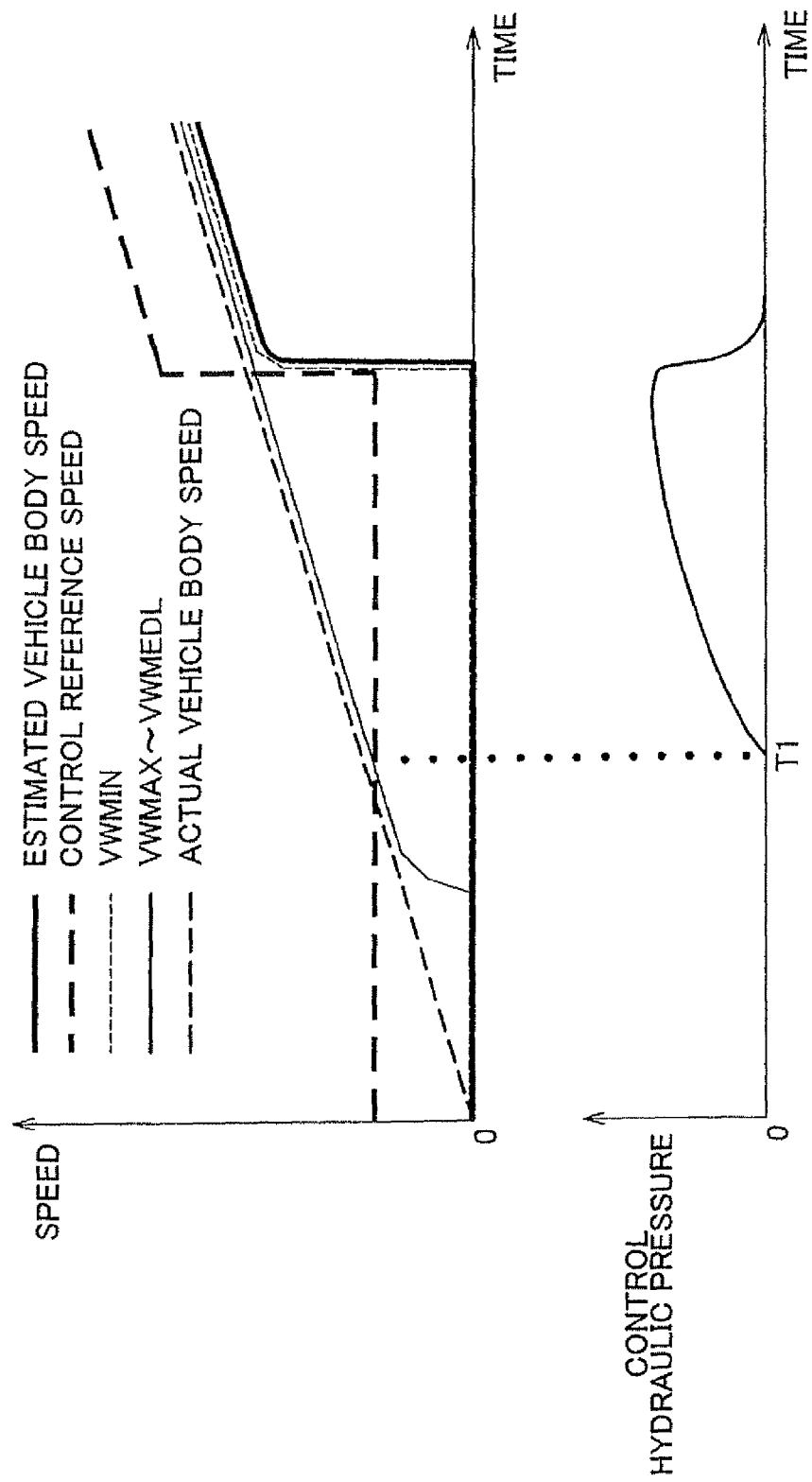
FIG. 5 is a time chart showing the TRC control using vehicle speeds estimated by a vehicle control device according to a comparative example.

As shown in the time chart of FIG. 5, if the vehicle speed is estimated based on the wheel speeds including the wheel speed VWMIN when even one wheel speed is not valid, a vehicle speed that is lower than the actual vehicle speed is estimated because of the wheel speed VWMIN. Then, a control reference speed that is lower than necessary is set. If TRC control is executed based on such a control reference speed, the calculated wheel speeds VWMAX to VWMEDL exceed the control reference speed at time T1, which leads to an unnecessary increase in control hydraulic pressure. In other words, a TRC malfunction occurs.

Figure 6:
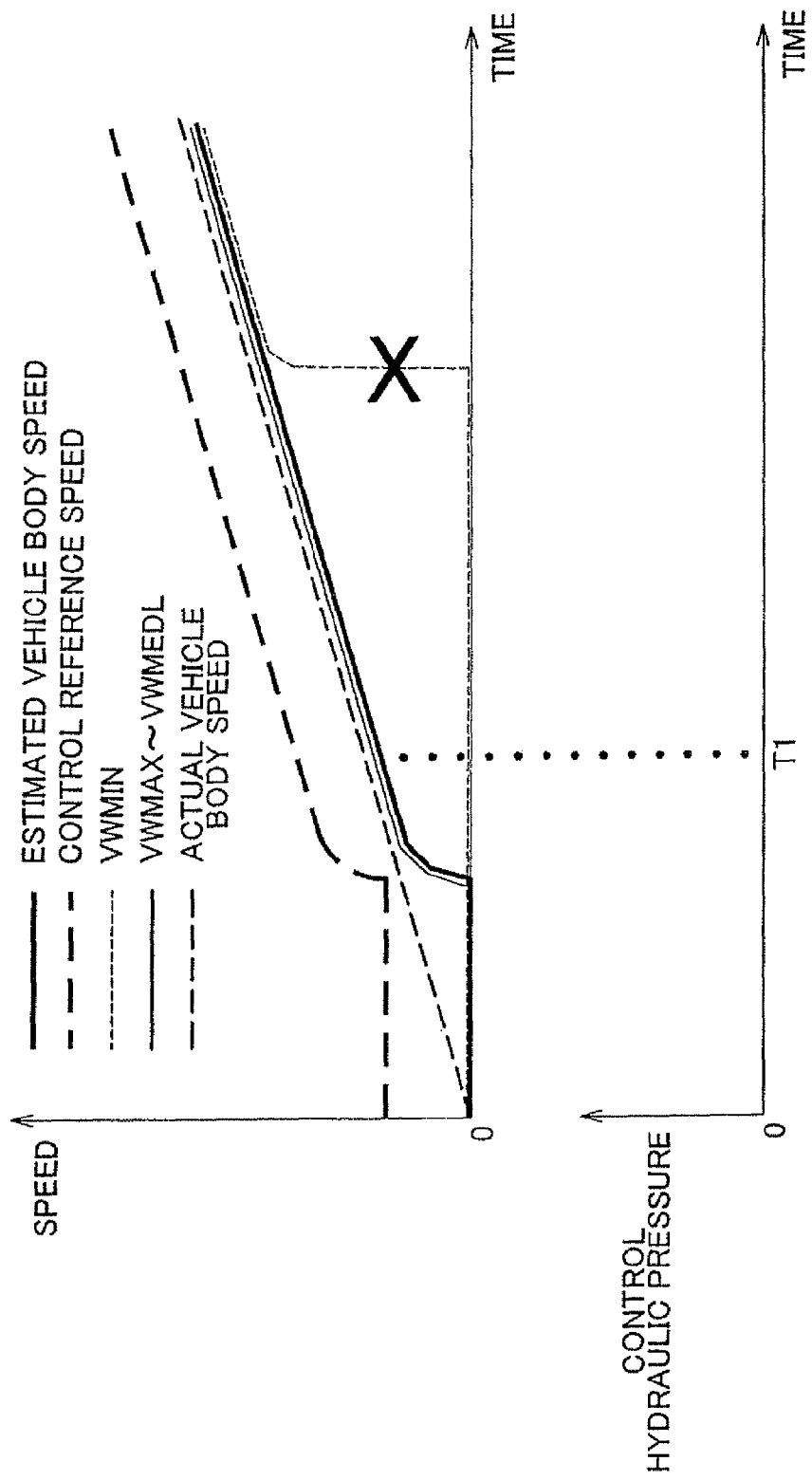

As shown in the time chart of FIG. 6, if the vehicle speed is estimated based on the wheel speeds except the wheel speed VWMIN if even one wheel speed is not valid, a vehicle speed close to the actual vehicle speed may be properly estimated. Then, the control reference speed is properly set. If the TRC control is executed based on the control reference speed, the calculated wheel speeds VWMAX to VWMEDL do not exceed the control reference speed at time T1 and the TRC control may be properly executed.

As described above, with the vehicle control device according to the first embodiment, an invalid wheel speed is excluded when the vehicle speed is estimated. In particular, because the validity of the wheel used to estimate the vehicle speed is fully assured, the reliability of vehicle control is improved.

Figure 7:
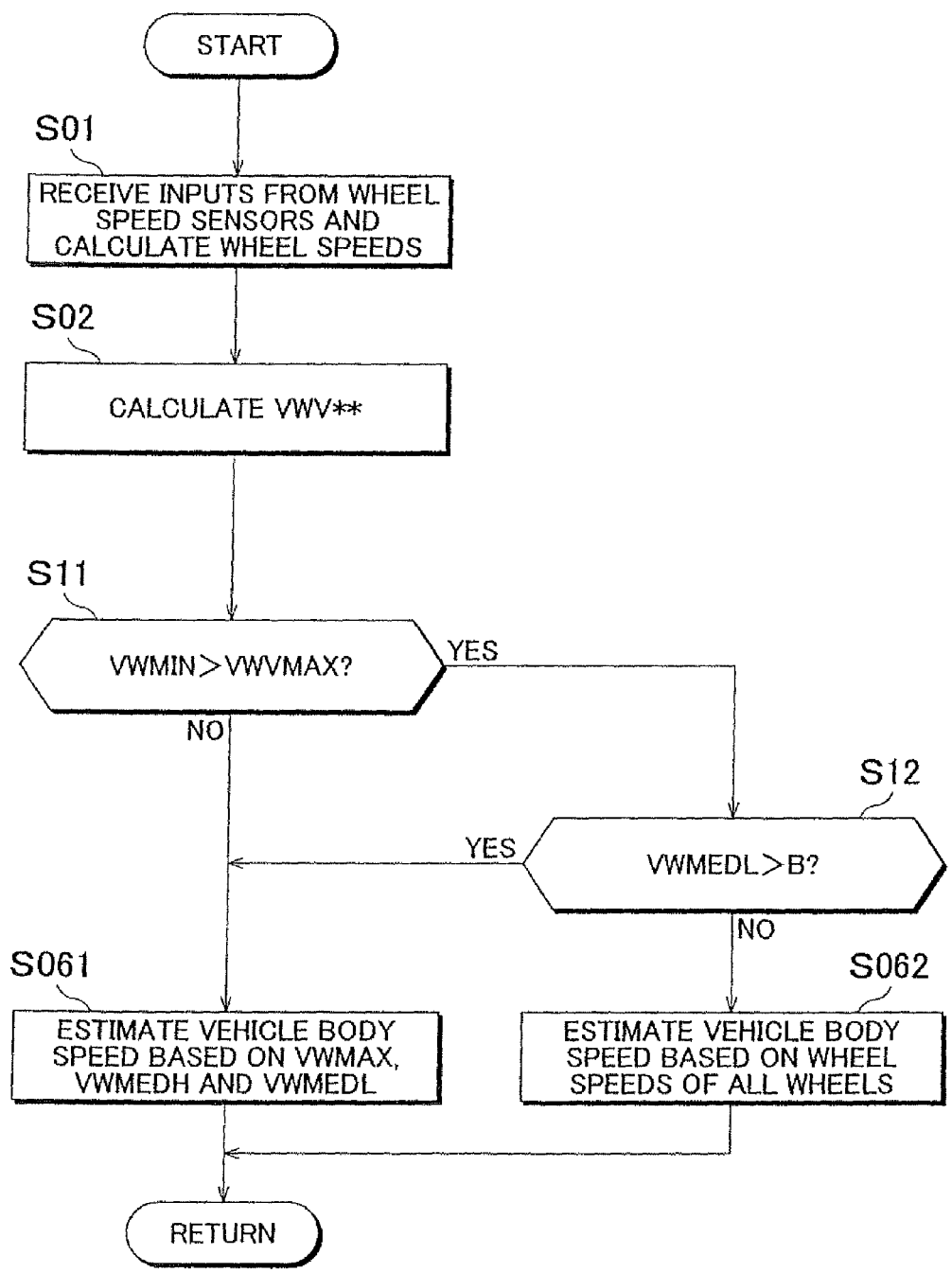
FIG. 7 is a flowchart of a vehicle speed estimation process in a vehicle control device according to a second embodiment.

Next, a second embodiment will be described. FIG. 7 is a flowchart of a vehicle speed estimation process in a vehicle control device according to a second embodiment. The configuration of the vehicle equipped with the vehicle control device according to the second embodiment may be the same as that of the vehicle of the first embodiment shown in FIG. 1 and hence its detailed description is omitted.

As shown in FIG. 7, as in the flowchart shown in FIG. 2, the CPU 51 calculates the wheel speeds VW based on inputs from the wheel speed sensors 41 when the vehicle 10 is in motion (step S01). Then, the CPU 51 calculates valid wheel speed threshold VWV** based on the calculated wheel speeds (step S02).

Then, in the second embodiment, the wheel speeds used to estimate the vehicle speed are determined based on the relation between the valid wheel speed threshold VWV and the wheel speeds VW.

More specifically, it is determined whether the relation "VWMIN>VWVMAX" is satisfied (step S11).

If the relation "VWMIN>VWVMAX" is satisfied (step S11: YES), it is determined that the wheel speeds of all the wheels are valid. Then, it is determined whether the relation "VWMEDL>B" is satisfied (step S12). The value B may be regarded as the specific vehicle speed threshold of the present invention.

If the relation "VWMEDL>B" is not satisfied (step S12: NO), that is, when the vehicle is traveling at a low speed, the CPU 51 estimates a vehicle speed based on the wheel speeds VW of all the wheels (step S062).

If the relation "VWMEDL>B" is satisfied (step S12: YES), that is, the vehicle is traveling at a high speed, there is a possibility that a wheel speed anomaly may occur and the estimated vehicle speed shows a sudden drop. Thus, the CPU 51 estimates the vehicle speed based on VWMAX, VWMEDH and VWMEDL (step S061). In other words, a vehicle speed is estimated based on the wheel speeds except the wheel speed VWMIN, which is the lowest of the four wheel speeds and which is a possibility that a wheel speed anomaly may occur. Then, a drop of the estimated vehicle speed may be prevented.

If the relation "VWMIN>VWVMAX" is not satisfied (step S11: NO), the CPU 51 also estimates a vehicle speed based on VWMAX, VWMEDH, and VWMEDL because at least one wheel speed is considered invalid (step S061).

As discussed above, with the vehicle control device according to the second embodiment, an invalid wheel speed may be excluded when the vehicle speed is estimated. In particular, the wheel speeds used to estimate the vehicle speed are properly determined based on the relation between the valid wheel speed threshold VVVV and the actual wheel speeds VW. Therefore, the reliability of vehicle control is improved. In addition, it is possible to avoid an unnecessary drop of the estimated vehicle speed value due to a wheel speed anomaly when the vehicle is traveling at a high speed.

The present invention is not limited to the embodiments described above and may be appropriately modified within the scope of the invention as understood from the claims and the entire specification. In addition, a vehicle control device including such a modification is also included in the technical scope of the present invention.

For example, in step S11 of FIG. 7, it may be determined whether the relation "VWMIN>VWVMAX+A" is satisfied instead of determining whether the relation "VWMIN>VWVMAX" is satisfied. Then, the robustness of the vehicle control can be improved. In addition, time monitoring may be involved in the decision process. Then, the determination does not necessarily have to be made based only on calculated wheel speeds.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle control device for controlling a driving force and a braking force that is applied to a vehicle to maintain a target wheel speed, the vehicle control device comprising:
    a plurality of determination parts each of which determines a wheel speed of a corresponding one of a plurality of wheels of the vehicle;
    a calculation part that calculates a valid wheel speed threshold, wherein the valid wheel speed threshold is initially set to a minimum wheel speed value that is detectable for each wheel, and is updated to be lowered to become closer to an actual valid wheel speed threshold, for each wheel based on the corresponding determined wheel speed;
    a decision part that compares the valid wheel speed threshold calculated for each wheel with a specific speed threshold value that is below the target wheel speed and decides the validity of each wheel speed based on the comparison; and
    an estimation part that estimates a vehicle speed based on the wheel speeds that are decided as being valid by the decision part,
    wherein, when it is decided that any of the wheel speeds is not valid, the estimation part estimates the vehicle speed based on the wheel speeds except at least one relatively low wheel speed.

2. The vehicle control device according to claim 1, wherein the decision part decides that the wheel speed is valid if the valid wheel speed threshold for the wheel is below the specific speed threshold value.

3. The vehicle control device according to claim 1, wherein the calculation part substitutes each valid wheel speed threshold with a value obtained by increasing the valid wheel speed threshold by a specified amount.

4. A vehicle control device for controlling a driving force and a braking force that is applied to a vehicle to maintain a target vehicle speed, the vehicle control device comprising:
    a plurality of determination parts each of which determines a wheel speed of a corresponding one of a plurality of wheels of the vehicle;
    a calculation part that calculates a valid wheel speed threshold, wherein the valid wheel speed threshold is initially set to a minimum wheel speed value that is detectable for each wheel, and is updated to be lowered to become closer to an actual valid wheel speed threshold, for each wheel based on the corresponding determined wheel speed;

a decision part that compares the wheel speed of each wheel determined with the valid wheel speed threshold calculated for the wheel and decides the validity of each wheel speed based on the comparison; and an estimation part that estimates a vehicle speed based on the wheel speeds that are decided as being valid by the decision part, wherein, when at least one of a high wheel speed among the determined wheel speeds of the wheels exceeds a threshold vehicle speed, the estimation part estimates the vehicle speed based on the wheel speeds except at least one of a low wheel speed.

5. The vehicle control device according to claim 4, wherein the decision part decides that the wheel speed is valid if the wheel speed is higher than the valid wheel speed threshold for the wheel.

6. The vehicle control device according to claim 4, wherein the calculation part substitutes each valid wheel speed threshold with a value obtained by increasing the valid wheel speed threshold by a specified amount.

7. A vehicle control device for controlling a driving force and a braking force that is applied to a vehicle to maintain a target vehicle speed, the vehicle control device comprising:

a plurality of determination parts each of which determines a wheel speed of a corresponding one of a plurality of wheels of the vehicle;

a calculation part that calculates a valid wheel speed threshold for each wheel, wherein the valid wheel speed threshold is initially set to a minimum wheel speed value that is detectable for each wheel, and is updated to be lowered to become closer to an actual valid wheel speed threshold, based on the corresponding determined wheel speed;

a decision part that compares the valid wheel speed threshold calculated for each wheel with a specific speed threshold value that is below a target wheel speed based on the target vehicle speed and decides the validity of each wheel speed based on the comparison; and an estimation part that estimates a vehicle speed based on the wheel speeds that are decided as being valid by the decision part, wherein, when at least one of a high wheel speed among the determined wheel speeds of the wheels exceeds a threshold vehicle speed, the estimation part estimates the vehicle speed based on the wheel speeds except at least one of a low wheel speed.

8. A vehicle control device for controlling a driving force and a braking force that is applied to a vehicle to maintain a target wheel speed, the vehicle control device comprising:

a plurality of means for determination, each of which determines a wheel speed of a corresponding one of a plurality of wheels of the vehicle;

means for calculating a valid wheel speed threshold, wherein the valid wheel speed threshold is initially set to a minimum wheel speed value that is detectable for each wheel, and is updated to be lowered to become closer to an actual valid wheel speed threshold, for each wheel based on the corresponding determined wheel speed;

decision means for comparing the valid wheel speed threshold calculated for each wheel with a specific speed threshold value that is below the target wheel speed and decides the validity of each wheel speed based on the comparison; and for estimating a vehicle speed of the vehicle based on the wheel speeds that are decided as being valid by the decision part, wherein, when at least one of a high wheel speed among the determined wheel speeds of the wheels exceeds a threshold vehicle speed, the means for estimating estimates the vehicle speed based on the wheel speeds except at least one of a low wheel speed.

9. A vehicle control device for controlling a driving force and a braking force that is applied to a vehicle to maintain a target vehicle speed, the vehicle control device comprising:

a plurality of means for determining, each of which determines a wheel speed of a corresponding one of a plurality of wheels of the vehicle;

means for calculating a valid wheel speed threshold for each wheel, wherein the valid wheel speed threshold is initially set to a minimum wheel speed value that is detectable for each wheel, and is updated to be lowered to become closer to an actual valid wheel speed threshold, based on the corresponding determined wheel speed;

means for comparing the wheel speed of each wheel determined with the valid wheel speed threshold calculated for the wheel and decides the validity of each wheel speed based on the comparison; and means for estimating a vehicle speed based on the wheel speeds that are decided as being valid by the decision part, wherein, when at least one of a high wheel speed among the determined wheel speeds of the wheels exceeds a threshold vehicle speed, the means for estimating estimates the vehicle speed based on the wheel speeds except at least one of a low wheel speed.

10. A vehicle control method for controlling a driving force and a braking force that are applied to a vehicle to maintain a target wheel speed, the vehicle control method comprising, with execution by a microprocessor, the steps of:

determining wheel speeds of a plurality of vehicle wheels;

calculating a valid wheel speed threshold, which is initially set to a minimum wheel speed value that is detectable for each wheel, and is updated to be lowered to become closer to an actual valid wheel speed threshold, for each wheel based on the determined wheel speeds;

comparing the valid wheel speed threshold calculated for each wheel with a threshold vehicle speed that is lower than the target wheel speed, and deciding the validity of each wheel speed based on the comparison; and estimating a vehicle speed based on the wheel speeds that are decided as being valid, wherein, when at least one of a high wheel speed among the determined wheel speeds of the wheels exceeds a threshold vehicle speed, the vehicle speed is estimated based on the wheel speeds except at least one of a low wheel speed.

11. A vehicle control method for controlling a driving force and a braking force that are applied to a vehicle to maintain a target vehicle speed, the vehicle control method comprising, with execution by a microprocessor, the steps of:

determining wheel speeds of a plurality of vehicle wheels;

calculating a valid wheel speed threshold, which is initially set to a minimum wheel speed value that is detectable for each wheel, and is updated to be lowered to become closer to an actual valid wheel speed threshold, for each wheel based on the determined wheel speeds;

comparing the valid wheel speed threshold calculated for each wheel with a threshold vehicle speed that is lower than a target wheel speed based on the target vehicle speed, and deciding the validity of each wheel speed based on the comparison; and estimating a vehicle speed based on the wheel speeds that are decided as being valid, wherein, when at least one of a high wheel speed among the determined wheel speeds of the wheels exceeds a threshold vehicle speed, the vehicle speed is estimated based on the wheel speeds except at least one of a low wheel speed.

12. A vehicle control method for controlling a driving force and a braking force that are applied to a vehicle to maintain a target vehicle speed, the vehicle control method comprising, with execution by a microprocessor, the steps of:

determining wheel speeds of a plurality of vehicle wheels;

calculating a valid wheel speed threshold, which is initially set to a minimum wheel speed value that is detectable for each wheel, and is updated to be lowered to become closer to an actual valid wheel speed threshold, for each wheel based on the determined wheel speeds;

comparing the wheel speed of each wheel determined with the valid wheel speed threshold calculated for the wheel, and deciding the validity of each wheel speed based on the comparison; and estimating a vehicle speed based on the wheel speeds that are decided as being valid, wherein, when at least one of a high wheel speed among the determined wheel speeds of the wheels exceeds a threshold vehicle speed, the vehicle speed is estimated based on the wheel speeds except at least one of a low wheel speed.

* * * * *